United States Patent [19]

Situ et al.

[11] Patent Number: 5,395,601
[45] Date of Patent: Mar. 7, 1995

[54] RE-CALCINATION AND EXTRACTION PROCESS FOR THE DETOXIFICATION AND COMPREHENSIVE UTILIZATION OF CHROMIC RESIDUES

[75] Inventors: Qi-Jiang Situ, No. 11, Fudi Lane, Haizhu Road; Ke-Ming Xu, both of Guangzhou; Pei-Nian Huang, Guangdong Province; Xing-Qin Li, Guangzhou; De-Han Zeng, Guangdong Province; Zhi-Fa Hu, Guangdong Province; Zhi-Quan Wen, Guangdong Province, all of China

[73] Assignees: Qi-Jiang Situ; Yan-Pei Huang, China

[21] Appl. No.: 865,123

[22] Filed: Apr. 8, 1992

[30] Foreign Application Priority Data

Apr. 9, 1991 [CN] China .................. 91 1 02325.9
Jan. 30, 1992 [CN] China .................. 92 1 00772.8

[51] Int. Cl.6 .................................... B01D 21/00
[52] U.S. Cl. .................................... 423/54; 423/55; 423/57
[58] Field of Search .................... 423/54, 55, 57

[56] References Cited

U.S. PATENT DOCUMENTS

| 2,292,495 | 8/1942 | Udy | 75/84 |
| 2,332,415 | 10/1943 | Udy | 75/84 |
| 5,215,727 | 6/1993 | Zeller, III et al. | 423/55 |

FOREIGN PATENT DOCUMENTS

| 154891 | 1/1952 | Australia | 423/57 |
| 85105628 | 1/1987 | China . | |
| 881050954 | 1/1989 | China . | |
| 901034207 | 12/1990 | China . | |
| 24083 | 3/1981 | Japan | 423/54 |
| 882936 | 11/1981 | U.S.S.R. | 423/57 |

Primary Examiner—Gary P. Straub
Assistant Examiner—Stuart L. Hendrickson

[57] ABSTRACT

A re-calcination and extraction process for the detoxification and comprehensive utilization of chromic residues, comprising adding small amount of residue ore powder, sodium carbonate, or additionally, a certain amount of coke powder to the poisonous chromic residues, and calcining the mixture in a re-calcinating apparatus at 1000°–1200° C., for 30–60 minutes. The re-calcined grog is extracted with water, to obtain an extractive liquor containing sodium chromate. The extractive liquor can be used to produce chromium oxide, basic chromium sulfate or medium chrome yellow; while the extracted residues can be sintered at high temperatures with iron ore powder and coke to obtain a massive self-melting sintered iron, which can be further converted to a low-chromium cast iron. This process can thoroughly detoxify the chromic residues, effectively recover $Cr_2O_3$ and remove water-soluble $Cr+6$, whereby various important industrial materials are produced. The method brings very good economical and environmental benefits.

9 Claims, 1 Drawing Sheet

Flow Chart Showing the Recalcination Process of the Present Invention

Flow Chart Showing the Recalcination
Process of the Present Invention

RE-CALCINATION AND EXTRACTION PROCESS FOR THE DETOXIFICATION AND COMPREHENSIVE UTILIZATION OF CHROMIC RESIDUES

BACKGROUND OF INVENTION

This invention relates to the disposal of solid wastes, especially with the process of detoxification and comprehensive utilization of chromic residues.

A large amount of chromic residues is discharged during the production of chromates by calcination of chromic ores. Statistics show that to produce a ton of sodium dichromate will discharge 2.5–3 tons of poisonous chromic residues, which contain 3–7% of residual $Cr_2O_3$, 8–11% of $Fe_2O_3$, and 0.5–1.5% of water-soluble $Cr+6$, the latter being poisonous to both human beings and animals. Discarding of metal oxides contained therein is not only a waste of resources, but will also pollute the environment.

There have been a large number of reports at home and abroad, concerning the disposal of chromic residues, which methods can be mainly put into two categories. One is by reduction, i.e., to reduce hexavalent chromium in the residues to trivalent, and then dispose the reduced residues by deep bury, discarding into the sea, or stacking within solid cache. On the basis of a thermal reduction disclosed in a USSR Patent 975580, CN 85105628 suggested a process, by which chromic residues were first extracted with hydrochloric acid, and then reduced by a reductant added. CN.90103420 reported a process to reduce chromic residues under high temperature and vacuum conditions. Any of the reduction process, however, bears the problem of trivalent chromium going up back to hexavalent, owing especially to the existence of oxides of calcium, magnesium and other metals in the chromic residues. Another method is to utilize chromic residues comprehensively as an industrial raw material, so as to not only consume the residues, but also gain some economic benefits. As shown in the Journal of "Wujiyan Gongye" (Chinese), No. 2, 1987, and CN 85105628, chromic residues were used for the coloration of glass, for the production of colored cement, bricks and calcium/magnesium/phosphorus fertilizers, as well as for iron smelting as a subsidiary material. Nevertheless, this method can neither be put into an industrial-scale production due to limited market, nor be spread readily due to complicated technology and high cost.

Many reports have revealed a process developed recently, by which chromic residues were reduced at high temperatures with subsidiary materials added, to realize the detoxification of chromic residues, as well as a comprehensive utilization thereof. As was disclosed in CN 88104766, chromic residues, calcined as the main component, were reduced at high temperatures in a blast furnace, with potash spar and lime added as subsidiary components, to form detoxified slags, which were used for the production of cement, potash fertilizer and chromium-containing cast iron. However, the direct smelting of sodium-containing (7–10%) chromic residues will lead to the formation of furnace nodule(s) and affect the strength of the same, thus shortening the service of the furnace.

OBJECT OF INVENTION

The object of the present invention is to provide a process of thorough detoxification of various kinds of chromic residues, and to comprehensively utilize the chromium contained therein.

BRIEF DESCRIPTION OF DRAWING

The present invention will now be described in details, with reference to the accompanied FIG. 1, which is a flow chart showing the recalcination process of this invention for the detoxification of chromic residues.

DESCRIPTION OF INVENTION

Figure 1:
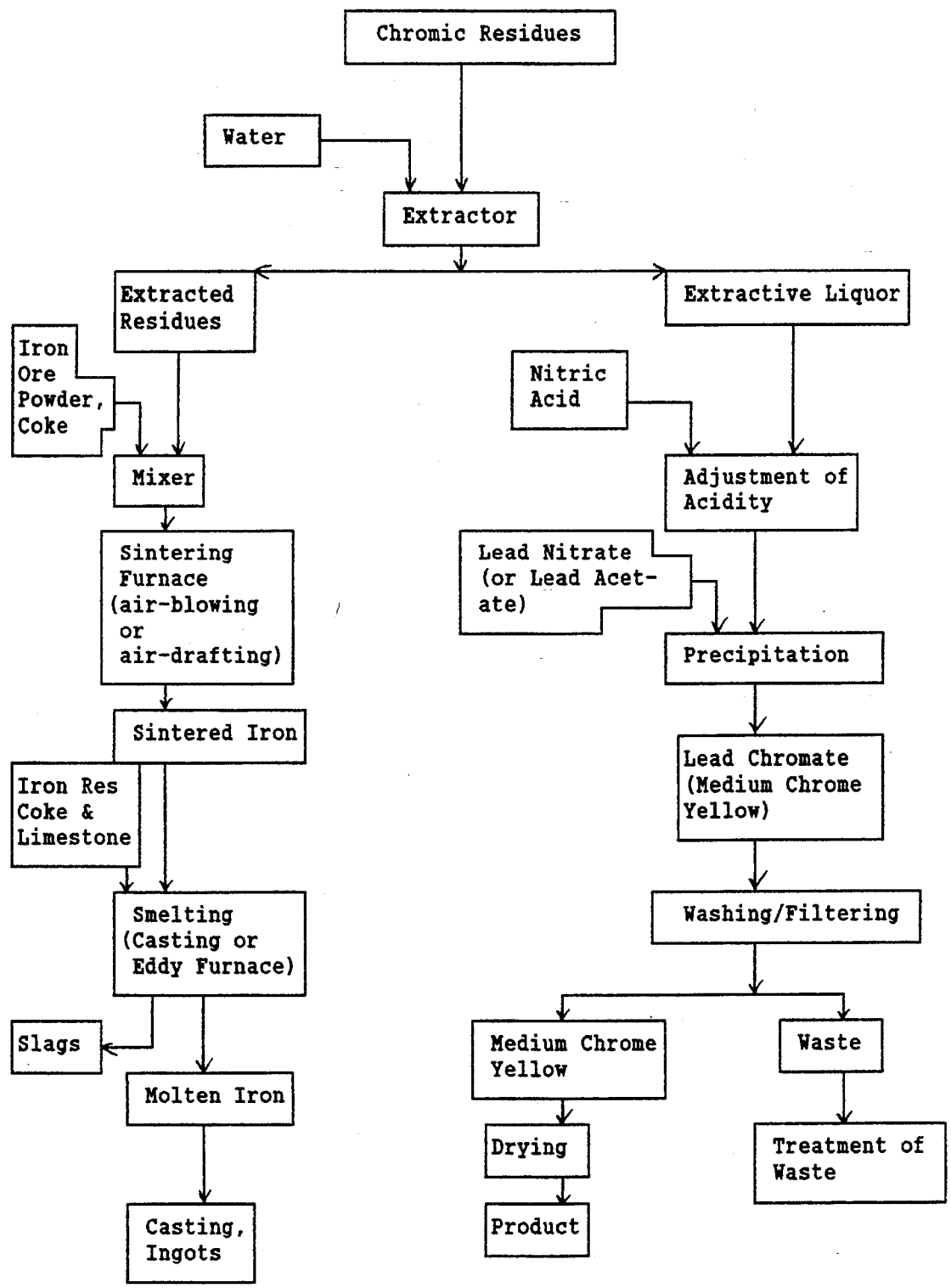

The object of the present invention is realized through re-calcination of the chromic residues in the following steps:

1) Re-calcination of Chromic Residues

Chromic residues are dried and crushed to 80–100 mesh, and made up into a burden in a ratio of:

chromic residue:chromic ore powder:sodium carbonate:
coke powder = 1:0.1–0.25:0.1–0.25:0–0.16 (wt); with water added and mixed homogeneously, the whole thing is then sent to a re-calcinating furnace. With the temperature in the furnace gradually increasing to 1000°–1200° C., said calcination is performed for about 30–60 minutes, to form a re-calcined grog. The re-calcination can also be performed in a rotary kiln at 100°–1200° C. for about 2 hrs.

The main chemical reactions for the above-mentioned re-calcination process of chromic residues are:

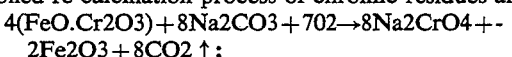
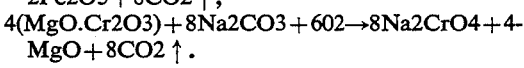

2) Extraction

The re-calcined grog is extracted with water in a high extractor, to let out the $Na_2CrO_4$ contained in it. The extractive liquor can be further treated, to obtain chemical materials, such as chromium oxide, basic chromium sulfate, or medium chrome yellow; and the extracted residues can also be further treated, resulting in a sintered iron or a low-chromium cast iron, and finally, a non-poisonous slag.

3) A Comprehensive Treatment of Extractive Liquor a) To Manufacture Chromium Oxide or Basic Chromium Sulfate The extractive liquor is pumped into a precipitating tank, with sulfur powder or sodium sulfide added and heating by steam to 100° C., to convert $Na_2CrO_4$ in the liquor to $Cr(OH)_3$. The main reaction is:

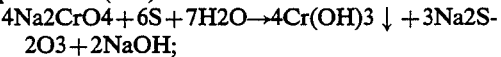
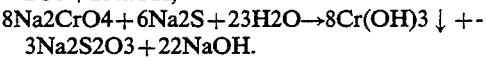

Then filtrate the products in the tank and wash with water the precipitate of chromium hydoxide, which is then calcined in a furnace at 1200° C., to form $Cr_2O_3$:

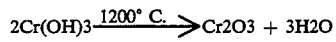

Basic chromium sulfate is formed if sulfuric acid or sodium hydrogen sulfate is added to the chromium hydroxide obtained:

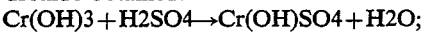

$Cr(OH)_3 + 2NaHSO_4 \rightarrow Cr(OH)SO_4 + Na_2SO_4 + 2H_2O$.

Sulfuric acid or sodium hydrogen sulfate is added to the mother liquor after separation of chromium hydroxide, to recover sodium sulfate; or sulfur dioxide is fed thereto, to obtain sodium thiosulfate, which is an important industrial material..

b) To Manufacture Basic Chromium Sulfate and Sodium Sulfate

The poisonous, strong corrosive residues of sodium hydrogen sulfate ($H_2SO_4$ 35-40%, $Na_2SO_4$ 45-50%, and $Na_2Cr_2O_7 \cdot 2H_2O$ 2-3%), discarded largely from a chromate plant when producing chromic anhydride ($Cr_2O_3$), are used to form a solution of $NaHSO_4$ by dissolving in water, settling and removing the impurity of acidic mud.

The extractive liquor is put into a neutralizing tank to be neutralized by adding the above-mentioned $NaHSO_4$ solution to obtain Ph=6-7 and is filtered under pressure to obtain a neutral solution of sodium chromate, which is then acidated in an acidator by adding $NaHSO_4$ again:

$2Na_2CrO_4 + 2NaHSO_4 \rightarrow Na_2Cr_2O_7 + 2Na_2SO_4 + H_2O$

Add sucrose or formaldehyde to the acidated liquor and heat it to above 100° C., to form basic chromium sulfate and sodium sulfate:

$8Na_2Cr_2O_7 + 48NaHSO_4 + C_{12}H_{22}O_{11} \rightarrow 16Cr(OH)SO_4 + 8Na_2SO_4 + 12CO_2 \uparrow + 2H_2O$ or
$2Na_2Cr_2O_7 + 12NaHSO_4 + 3HCHO \rightarrow 4Cr(OH)SO_4 + 8Na_2SO_4 + 3CO_2 \uparrow + 7H_2O$ When reaction is completed, let it cool to 21°-24° C., and the crystals of sodium sulfate decahydrate are isolated. Then, separate sodium sulfate decahydrate by centrifuge to obtain a standard product of basic chromium sulfate.

c) To Manufacture Medium Chrome Yellow

Neutralize the extractive liquor with nitric acid to a Ph=6.0-8.0; further add a solution of lead nitrate or lead acetate to it, and lead chromate is formed. The main reaction is:

$Na_2CrO_4 + Pb(NO_3)_2 \rightarrow PbCrO_4 \downarrow + 2NaNO_3$ or
$Na_2CrO_4 + Pb(CH_3COO)_2 \rightarrow PbCrO_4 \downarrow + 2CH_3COONa$ Separate, wash and filter under pressure the lead chromate formed; after drying at 70°-100° C. and grinding, medium chrome yellow of required mesh is obtained.

4) Treatment of Extracted Residues

A burden is made up in the ratio of:
extracted residue:iron ore powder (smaller than 6 mm in size, iron 38-55%):coke = 1:1.0-2.4:0.1-0.28 (Wt). Put it into an air-blowing or air-drafting sintering furnace, with air blowing or drafting continuously after ignition and the temperature increasing to 1300°-1500° C., to be sintered to form a massive, self-melting sintered iron, in which Cr+6 is reduced to a stable trivalent chromic compound. The main reactions are:

$2Na_2CrO_4 + 3CO \rightarrow Cr_2O_3 + 2Na_2O + 3CO_2 \uparrow$;
$2CaCrO_4 + 3CO \rightarrow Cr_2O_3 + 2CaO + 3CO_2 \uparrow$;

Due to the original existence of a large amount of $SiO_2$ in the chromic residues, further reactions occur:

$Cr_2O_3 + Na_2O + 2SiO_2 \rightarrow NaCrSiO_4$;
$Cr_2O_3 + 3CaO + 3SiO_2 \rightarrow Ca_3Cr_2(SiO_4)_3$.

A burden is further made up in a ratio of:

self-melting sintered iron (larger than 5 mm and smaller
then 80 mm in size):iron residue (smaller than 6 mm, iron 48-65%):coke:limestone = 1:0.5-2.6:0.1-1.5:0.15-0.22.

The burden is fused at 1350°-1500° C. in a casting or eddy furnace, and reduced for detoxification, and separated by layers, to obtain a low-chromium cast iron and non-poisonous slags. The main reactions are:

$Cr_2O_3 + 3CO \rightarrow 2Cr + 3CO_2 \uparrow$;
$Cr_2O_3 + 3H_2 \rightarrow 2Cr + 3H_2O$;
$Cr_2O_3 + 3C \rightarrow 2Cr + 3CO \uparrow$;
$FeO \cdot Cr_2O_3 + C \rightarrow Fe + Cr_2O_3 + CO \uparrow$;
$Cr_2O_3 + 2Fe + 3C \rightarrow 2Cr \cdot Fe + 3CO \uparrow$;
$SiO_2 + Fe + 2C \rightarrow Fe \cdot Si + 2CO \uparrow$; and
$Cr_2O_3 + 2Fe \cdot Si + 3C \rightarrow 2Fe \cdot Cr \cdot Si + 3CO \uparrow$.

By using the re-calcination process described in the present invention, the $Cr_2O_3$ contained in various types of chromic residues, some of which are difficult to detoxify by direct extraction, can be converted to $Na_2CrO_4$, so as to enable $Cr_2O_3$ to be utilized effectively, and chromic residues in turn can be detoxified thoroughly. After the above-mentioned re-calcination treatment, 50-60% of $Cr_2O_3$ in the chromic residues can be recovered, 60-70% of water-soluble Cr+6 is removed, with various important industrial materials obtained, so that a comprehensive utilization of the whole chromic residues is realized without any secondary pollution, and showing good benefits in both enrironmental and economic respects.

In combination with the attached figure, some examples will be given below, to illustrate in details the process of this invention

EXAMPLE 1

The composition of the chromic residues used in this example is shown as follows:

| Content | $Cr_2O_3$ | soluble $Cr+6$ | $Fe_2O_3$ | Cao | MgO | $SiO_2$ | $Al_2O_3$ |
|---|---|---|---|---|---|---|---|
| Wt % | 5.43 | 0.49 | 9.02 | 29.67 | 25.90 | 6.38 | 6.79 |

The above-mentioned chromic residues were dried and crushed to 80-100 mesh,. of which 120 Kg (dry basis) were taken; and further, 16.6 Kg of chromic ore powder ($Cr_2O_3$ 48.13%), 21Kg of sodium carbonate and 10 Kg of coke powder were added. These were mixed with water homogeneously in a mixer, and calcined in a disc re-calcinating furnace for 1 hour, under 1000°-1200° C. and 4900-6230 Pa negative pressure (by air-drafting), to obtain 174 Kg of re-calcined grog, which contained 11.26% of total chromium and 6.58% of water-soluble Cr+6 (both on the basis of $Cr_2O_3$), the conversion of $Cr_2O_3$ being 58.44%.

The grog was extracted with water in an extractor to obtain 0.161 M3 of extractive liquor (containing $Na_2CrO_4$, 151.4g/l). The extractive liquor was led into a precipitating reactor to react with 7.32 Kg of sulfur powder added, and direct heated to 100° C. by steam. After reaction is completed, filtration, separation and washing were performed, resulting in 23.5 Kg (wet) of chromium hydroxide, which were further dried and calcined at 1200° C., to obtain 10.7 Kg of chromium oxide ($Cr_2O_3$ 92.4%).

EXAMPLE 2

The same chromic residue powder (100 Kg, dry basis) and chromic ore powder (20 Kg) as in Example 1 were taken, into which 22.5 Kg of sodium carbonate and 9 Kg of coke were added. These were mixed with water homogeneously and then calcined in a re-calcinating furnace for 35 minutes under the same temperature and negative pressure (by air-drafting) conditions as in Example 1, to form 114 Kg of re-calcined grog, which contained 12.31% of total chromium and 7.57% of water-soluble Cr+6 (both on the basis of Cr2O3), the conversion of Cr2O3 being 61.52%.

The grog was extracted with water in an extractor, to obtain 0.108 M3 of extractive liquor containing 16.5 Kg of Na2CrO4 (152.5g/l). The basic Na2CrO4 extractive liquor was poured into a neutralizing tank, with strong acidic sodium hydrogen sulfate added (specific weight 1.41-1.45, obtained by dissolving chromic anhydride dross in water, settling, and removing the impurity of acidic mud), to neutralize to a Ph=6.5, to form a neutral solution of sodium chromate.

The neutral solution of sodium chromate was poured into an acidating tank, and again the above-mentioned sodium hydrogen sulfate was added, to neutralize to Ph=1.5-2.0, which converted Na2CrO4 to Na2Cr2O7. Next, 2.181 Kg of sucrose crystals were added slowly while continuously agitating to form basic chromium sulfate. No Cr+6 was detected indicating that the reductive reaction had proceeded to completion.

After standing by, cooling water was poured into the insulating jacket of the tank, to lower the temperature to 22° C., and the Na2SO4 in the solution was converted to the isolated crystals of sodium sulfate decahydrate. The crystals were finally separated with centrifuge, to obtain 63.4 Kg of basic chromium sulfate (liquid). Examination showed that the basic chromium sulfate contained 11.83% of Cr2O3 with a basicity of 40.22%, which completely met with the requirements for the product.

In this example, 0.069 M3 of NaHSO4 solution was produced by using 69 Kg of poisonous, strong acidic dross of chromic anhydride.

EXAMPLE 3

In this example, the composition of chromic residues and chromic ores is shown below (Wt %):

| % | Cr2O3 | soluble Cr + 6 a) | Fe2O3 | CaO | Mgo | SiO2 | Al2O3 |
|---|---|---|---|---|---|---|---|
| Cr Res. | 7.00 | 2.14 | 10.16 | 31.68 | 23.80 | 5.40 | 9.96 |
| Cr ores | 25.69 | — | 11.68 | 1.20 | 27.24 | 15.50 | 11.04 | a) On the basis of Cr2O3.

The above-mentioned chromic residues were dried and crushed to 80-100 mesh, of which 100 portions were taken; further, 25 portions of chromic ores and 16 portions of sodium carbonate were taken. These were mixed homogeneously in a mixer and re-calcined in a Φ 1800×28 M rotary kiln for 2 hours, at 1050° C. Five tests were made and the results thereof follow:

| No. | Cr Res (Kg) | Cr Ores (Kg) | Sodium carbonate (Kg) | Grog formed (Kg) | Total Cr Cr2O3 % | Soluble Cr + 6 Cr2O3 % | Conversion (%) |
|---|---|---|---|---|---|---|---|
| 1 | 7410 | 1800 | 1134 | 9485 | 9.26 | 8.7 | 93.95 |
| 2 | 16800 | 4200 | 2646 | 12820 | 13.53 | 10.6 | 78.34 |
| 3 | 12000 | 3000 | 1890 | 10783 | 13.30 | 9.23 | 69.40 |
| 4 | 14400 | 3600 | 2268 | 10110 | 10.47 | 9.81 | 93.70 |
| 5 | 14400 | 3600 | 2268 | 9830 | 11.69 | 9.59 | 81.99 |
| Total | 65010 | 16200 | 10206 | 52983 | 11.65 | 9.58 | 82.28 |

All the grogs formed in the five tests were extracted with water, to obtain 30.96 M3 of basic extractive liquor containing 9299.7 Kg of Na2CrO4 (300.37 g/l), which was scaled to 8555.4 Kg of Na2Cr2O7.2H2O with an extraction rate of 854. All the basic extractive liquor obtained was transferred to the process section of sodium dichromate. In this example, 65010 Kg of chromic residues were totally treated and 52983 Kg of grogs were formed, with a conversion rate of 82.28% during re-calcination, and an extraction rate of 85%. The chromic residues after extraction contained 3.56% of total chromium (Cr2O3), 0.75% of water-soluble Cr+6 (on the basis of Cr2O3), 11.85% of Fe2O3, 26.61% of CaO, 25.25% of MgO. 6.61% of SiO2, and 10.96% of Al2O3. And, as compared with the original residues, 49.14% of total chromium was extracted, and 64.95% of water-soluble Cr+6 was removed. This process, therefore, can effectively recover and utilize either hexavalent or trivalent chromium, and in the meantime, thoroughly detoxify chromic residues.

What is claimed is:

1. A calcination and extraction process for the detoxification and comprehensive utilization of chromic residues, comprising the following steps:
   a. preparing a composition in a ratio of: chromic residues:chromic ore powder: sodium carbonate:-coke powder=1:0.1-0.25:0.2-0.25:0-0.16 (Wt); adding water and mixing to homogeneity, the chromic residues used being pre-dried and crushed to 80-100 mesh;
   b. healing the composition to 1000°-1200° C. and calcining for 30-60 minutes to form a grog; and
   c. adding water to said grog to extract the Na2CrO4 in it and obtain an extractive liquor containing the Na2CrO4, the remaining material being extract residue.

2. A process, as claimed in claim 1, wherein sodium hydrogen sulfate is added to the extractive liquor, to obtain a Ph value of 6-7, and the neutral sodium chromate solution is acidified with sodium hydrogen sulfate again; and further, sucrose or formaldehyde is added, followed by heating to above 100° C., to form chromium sulfate and sodium sulfate, which, after completion of reaction, are cooled to 21°-24 C., and separated, to obtain sodium sulfate decahydrate crystals and chromium sulfate.

3. A process, as claimed in claim 1, wherein the extractive liquor is neutralized with nitric acid to Ph=6.0-8.0, and a solution of lead nitrate or lead acetate is further added, to form lead chromate.

4. A process, as claimed in claim 1, further comprising the step of adding sulfur powder or sodium sulfide to the extractive liquor and heating by steam to 100° C., to obtain a precipitate of chromium hydroxide, which is further separated and then calcined in a furnace at 1200° C. the produce chromium oxide.

5. A process, as claimed in claim 1, wherein the homogeneous mixture is calcined for two hours.

6. The process of claim 1, further comprising the step of taking the extracted residue and preparing a composition in a ratio of:

extracted residue:iron ore powder:coke=1:1.0-2.4:0.10-0.28 (Wt), calcining in a furnace at 1300°-1500° C. to form a sintered iron, the iron ore powder used being smaller than 6 mm in size and containing 38-55% of iron.

7. A process, as claimed in claim 5, further comprising the step of taking the extracted residue and preparing a composition in a ratio of:

extracted residue:iron ore powder:coke=1:1.0-2.4:0.10-0.28 (Wt), calcining in a furnace at 1300°-1500° C. to form a sintered iron, the iron ore powder used being smaller than 6 mm in size and containing 38-55% of iron.

8. A process, as claimed in claim 4, wherein sulfuric acid or sodium hydrogen sulfate is added to the liquor obtained after separation of chromium hydroxide to obtain sodium sulfate.

9. A process, as claimed in claim 4, wherein sulfuric acid or sodium hydrogen sulfate is added to the chromium hydroxide obtained, to form chromium sulfate.

* * * * *